US006983530B2

(12) United States Patent
Gill (10) Patent No.: US 6,983,530 B2
(45) Date of Patent: Jan. 10, 2006

(54) METHOD OF MAKING A DUAL GMR READ HEAD WITH SELF-PINNED LAYER AND SPECULAR REFLECTOR

(75) Inventor: Hardayal Singh Gill, Portala Valley, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 76 days.

(21) Appl. No.: 10/611,628

(22) Filed: Jun. 30, 2003

(65) Prior Publication Data

US 2004/0080854 A1 Apr. 29, 2004

Related U.S. Application Data

(62) Division of application No. 09/760,937, filed on Jan. 16, 2001, now Pat. No. 6,655,008, which is a division of application No. 09/344,817, filed on Jun. 25, 1999, now Pat. No. 6,219,208.

(51) Int. Cl.
G11B 5/187 (2006.01)
(52) U.S. Cl. .............................. 29/603.14; 29/603.13; 29/603.23; 427/131
(58) Field of Classification Search ............ 29/603.13, 29/603.14, 603.07, 603.23, 606; 427/127, 427/131; 360/324.1, 324.12
See application file for complete search history.

(56) References Cited

U.S. PATENT DOCUMENTS 5,974,657 A * 11/1999 Fox et al. ............ 29/603.14 X

OTHER PUBLICATIONS

Kanai et al., "Spin-Valves with Bias Compensation Layer", IEEE Transactions on Magnetics, vol. 34, No. 4, Jul. 1998, pp. 1498-1500.*

* cited by examiner

Primary Examiner—A. Dexter Tugbang
(74) Attorney, Agent, or Firm—Ronald B. Feece; Lewis L. Nunnelley; Robert B. Martin (57) ABSTRACT

A dual GMR or dual spin valve sensor has a self-pinned layer which has its magnetic moment pinned perpendicular to an air bearing surface by sense current fields from conductive layers in the dual spin valve sensor when a sense current is conducted therethrough. This scheme eliminates one of the antiferromagnetic pinning layers which is typically employed in a dual GMR or dual spin valve sensor. The self-pinned layer is thin so that its demagnetization field will not be greater than the sense current fields acting thereon. Because of the thinning of the self-pinned layer the spin valve effect of the spin valve sensor is degraded by scattering of conduction electrons at the boundary of the self-pinned layer. In order to overcome this problem a specular reflector layer is employed in contact with the self-pinned layer for reflecting the conduction electrons back into a mean free path of conduction electrons so that the spin valve effect on the self-pinned layer side of the spin valve sensor can be added to another spin valve effect on the other side of the free layer structure for providing a double spin valve effect with an improved read gap, as compared to prior art dual spin valve sensors.

9 Claims, 11 Drawing Sheets

FIG. 11
(ABS)

METHOD OF MAKING A DUAL GMR READ HEAD WITH SELF-PINNED LAYER AND SPECULAR REFLECTOR

REFERENCE TO RELATED APPLICATIONS

This application is a divisional application of Ser. No. 09/760,937, filed on Jan. 16, 2001 and now U.S. Pat. No. 6,655,008, which is a divisional application of 09/344,817, filed on Jun. 25, 1999 and now U.S. Pat. No. 6,219,208.

BACKGROUND OF THE INVENTION

1. Field of the Invention

The present invention relates to a dual spin valve sensor with a self-pinned layer and a specular reflector and, more particularly, to a read head that produces a double spin valve effect with a pinned layer structure and self-pinned layer wherein the pinned layer structure is pinned by a pinning layer and the self-pinned layer is pinned by sense current fields and interfaces a specular reflector layer for reflecting conduction electrons into the mean free path of conduction electrons.

2. Description of the Related Art

An exemplary high performance read head employs a spin valve sensor for sensing magnetic fields on a moving magnetic medium, such as a rotating magnetic disk or a linearly moving magnetic tape. The sensor includes a nonmagnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the magnetic medium. First and second leads are connected to the spin valve sensor for conducting a sense current therethrough. The magnetic moment of the free layer is free to rotate in positive and negative directions from a quiescent or zero bias point position in response to positive and negative magnetic signal fields from a moving magnetic medium. The quiescent position is the position of the magnetic moment of the free layer when the sense current is conducted through the sensor without magnetic field signals from a rotating magnetic disk. The quiescent position of the magnetic moment of the free layer is preferably parallel to the ABS. If the quiescent position of the magnetic moment is not parallel to the ABS the positive and negative responses of the free layer will not be equal which results in read signal asymmetry.

The thickness of the spacer layer is chosen to be less than the mean free path of electrons conducted through the sensor. With this arrangement, a portion of the conduction electrons is scattered by the interfaces or boundaries of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos\theta$, where $\theta$ is the angle between the magnetic moments of the pinned and free layers. This resistance, which changes when there are changes in scattering of conduction electrons, is referred to in the art as magnetoresistance (MR). Magnetoresistive coeffecient is $dr/R$ where $dr$ is the change in magnetoresistance of the spin valve sensor from minimum magnetoresistance (magnetic moments of free and pinned layers parallel) and $R$ is the resistance of the spin valve sensor at minimum magnetoresistance. For this reason a spin valve sensor is sometimes referred to as a giant magnetoresistive (GMR) sensor. A spin valve sensor has a significantly higher magnetoresistive (MR) coefficient than an anisotropic magnetoresistive (AMR) sensor which does not employ a pinned layer.

The spin valve sensor is located between first and second nonmagnetic nonconductive first and second read gap layers and the first and second read gap layers are located between ferromagnetic first and second shield layers. The distance between the first and second shield layers is referred to in the art as the read gap. The read gap determines the linear bit density of the read head. When a magnetic disk of a magnetic disk drive rotates adjacent the read sensor, the read sensor detects magnetic field signals from the magnetic disk only within the read gap, namely the distance between the first and second shield layers. There is a strong-felt need to decrease the read gap so that the sensor is capable of detecting an increased number of field signals along a track of the rotating magnetic disk. By decreasing the read gap the magnetic storage capability of the disk drive is increased. These kinds of efforts have improved the magnetic storage of computers from kilobytes to megabytes to gigabytes.

Another scheme for increasing the magnetic storage of a disk drive in a computer is to provide a read sensor that produces a dual spin valve effect. This is accomplished by providing a ferromagnetic free layer structure between nonmagnetic conductive first and second spacer layers with the first and second spacer layers are located between first and second ferromagnetic pinned layer structures. The first pinned layer structure is exchange coupled to a first antiferromagnetic pinning layer which pins a magnetic moment of the first pinned layer structure in a first direction, typically perpendicular to the ABS, either toward or away from the ABS, and the second pinned layer structure is exchange coupled to a second antiferromagnetic pinning layer which pins the magnetic moment of the second pinned layer structure in the same direction as the moment of the first pinned layer structure. This scheme sets the magnetic moments of the first and second pinned layer structures in phase with respect to one another. The free layer structure has a magnetic moment which is typically parallel to the ABS, so that when magnetic field signals from a rotating magnetic disk are sensed by the read sensor the magnetic moments of the free layers rotate upwardly or downwardly, producing an increase or decrease in the aforementioned magnetoresistance, which is detected as playback signals. The importance of the dual spin valve sensor is that the spin valve effect is additive on each side of the free layer between the free layer structure and the first and second pinned layer structures. Unfortunately, the dual spin valve sensor is significantly thicker than a single pinned spin valve sensor because of the thicknesses of the first and second pinning layers. While the thicknesses of the various layers of a typical spin valve sensor range between 10 Å–70 Å the thicknesses of the antiferromagnetic pinning layers vary in a range from 120 Å–425 Å. Iridium manganese (IrMn) permits the thinnest antiferromagnetic pinning layer of about 120 Å whereas an antiferromagnetic pinning layer composed of nickel oxide (NiO) is typically 425 Å. There is a strong-felt need to provide a dual GMR or spin valve sensor which is thinner than prior art dual spin valve sensors so that a dual spin valve effect can be obtained without significantly increasing the read gap.

SUMMARY OF THE INVENTION

The present invention provides a novel dual spin valve sensor which is thinner than prior art dual spin valve sensors. The present dual spin valve sensor may be the same as the aforementioned dual spin valve sensor except one of the pinned layer structures is a self-pinned layer which is located between a specular reflector structure and one of the spacer layers. The magnetic moment of the self-pinned layer is not pinned by an antiferromagnetic pinning layer but, in contrast, the magnetic moment is pinned by sense current fields from other layers in the spin valve sensor when the sense current is conducted through the spin valve sensor. In order for this to occur the thickness of the self-pinned layer should be maintained below 15 Å with a preferable thickness of 10 Å. The reason for this is because the thicker the self-pinned layer the greater the sense current fields that are required to pin the magnetic moment of the self-pinned layer. Unfortunately, when the self-pinned layer is thin there is a scattering of conduction electrons at a boundary of the self-pinned layer, which reduces the number of conduction electrons in the mean free path which, in turn, reduces the magnetoresistive coefficient (dr/R). The ideal situation is for the scattering events of the conduction electrons in the mean free path to be in phase. When there is scattering at a boundary of the mean free path this is referred to in the art as inelastic scattering which causes the scattering events to be out of phase and to work against one another to reduce the magnetoresistive coefficient (dr/R). Accordingly, a thin self-pinned layer does not provide an adequate boundary for the mean free path to prevent boundary scattering of conduction electrons.

I have found that by locating the self-pinned layer between a specular reflector structure and one of the spacer layers that the scattering of the conduction electrons at the boundary can be obviated. In a preferred embodiment, the specular reflector structure includes a first specular reflector layer composed of silver (Ag) and a second specular reflector layer composed of copper (Cu) with the second specular reflector layer being located between and interfacing the first specular reflector layer and the self-pinned layer. The specular reflector structure functions as a mirror in that conduction electrons are reflected by the specular reflector structure back into the mean free path of conduction electrons. Silver (Ag) is a better specular reflector than copper (Cu). Accordingly, the first specular reflector layer of silver (Ag) reflects the majority of the conduction electrons while the second specular reflector layer (Cu) reflects a smaller portion of the conduction electrons. However, the second specular reflector layer of copper (Cu) is highly desirable because of its compatibility with materials employed for the self-pinned layer and particularly for promoting a uniforms microstructure of the self-pinned layer which increases the magnetoresistive coefficient (dr/R).

In a preferred embodiment I have maintained the thickness of the second reflector layer of copper (Cu) as thin as possible so as to reduce current shunting. Current shunting is a portion of the sense current which is conducted through layers other than the free layer structure and the first and second spacer layers. Current shunting also reduces the magnetoresistive coefficient (dr/R). Accordingly, the second specular reflector layer of copper (Cu) is maintained with a thickness of about 10 Å. In the preferred embodiment the thickness of the first specular reflector layer of silver (Ag) is 20 Å. Accordingly, a total thickness of 30 Å of the specular reflector structure is significantly less than the thickness required for an antiferromagnetic pinning layer. In this example, the overall thickness of the present dual spin valve sensor is reduced by the difference between the thickness of an antiferromagnetic pinning layer and 30 Å. This can result in the present dual spin valve sensor having its thickness reduced by 90 Å–395 Å.

An object of the present invention is to provide a dual spin valve read sensor which has a reduced thickness.

Another object is to provide a dual spin valve read sensor which has only one antiferromagnetic pinning layer.

A further object is to provide a dual spin valve sensor which has a specular reflector structure next to a self-pinned layer for reflecting conduction electrons into a mean free path of conduction electrons for increasing the magnetoresistive coefficient (dr/R).

Other objects and attendant advantages of the invention will be appreciated upon reading the following description taken together with the accompanying drawings.

Figure 6:
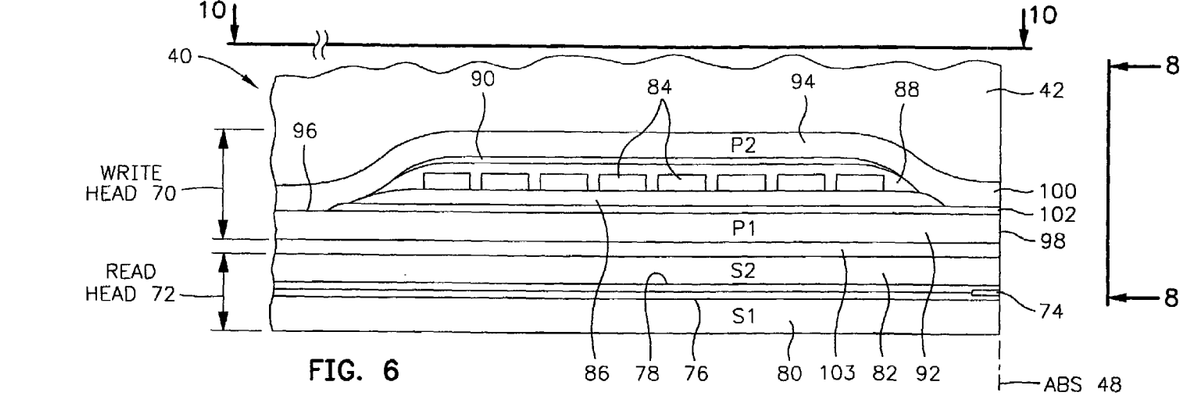
FIG. 6 is a partial view of the slider and a piggyback magnetic head as seen in plane 6—6 of FIG. 2.
Figure 8:
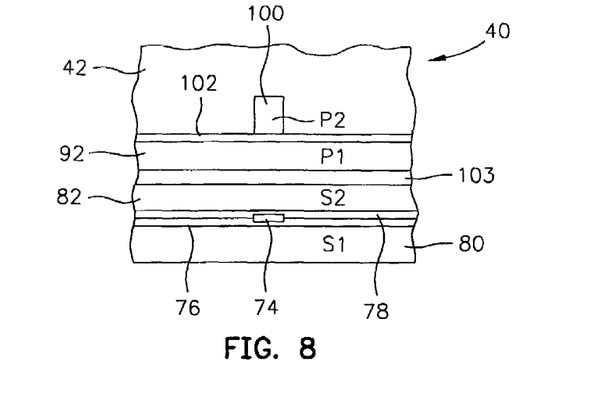
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes.

Figures 2, 3:
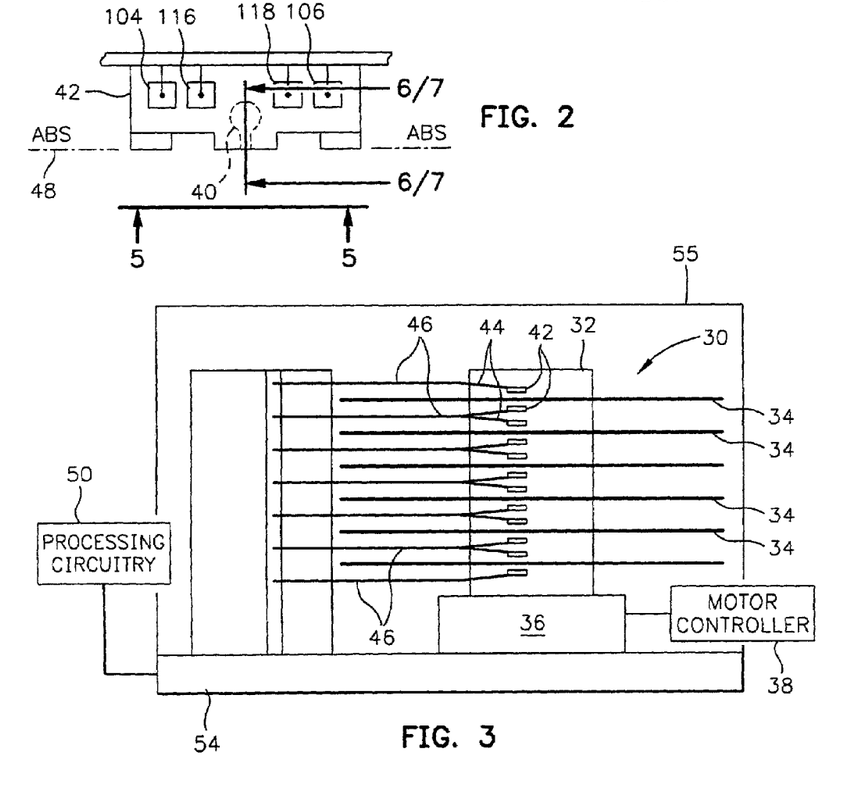
FIG. 2 is an end view of a slider with a magnetic head of the disk drive as seen in plane 2—2.
FIG. 3 is an elevation view of the magnetic disk drive wherein multiple disks and magnetic heads are employed.

These potential changes are then processed as readback signals by the processing circuitry 50 shown in FIG. 3.

Figure 4:
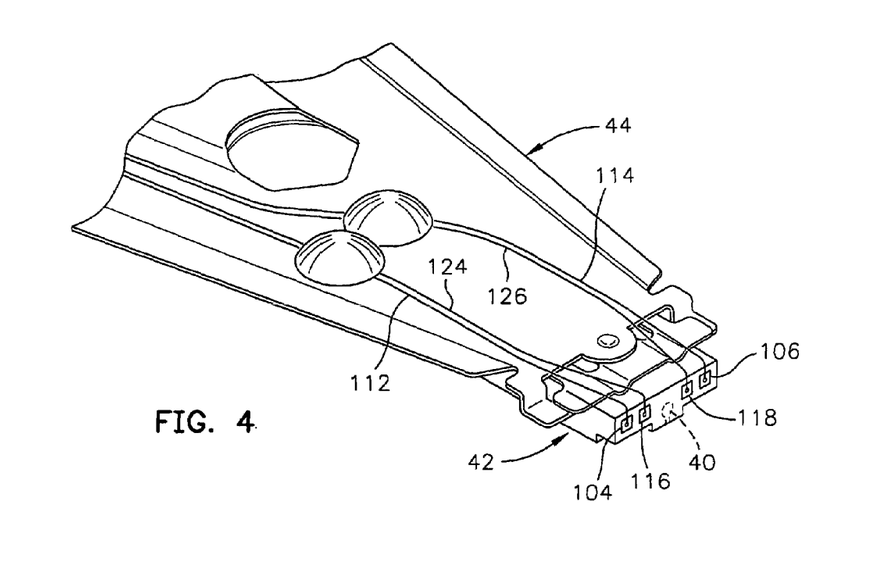
FIG. 4 is an isometric illustration of an exemplary suspension system for supporting the slider and magnetic head.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 7:
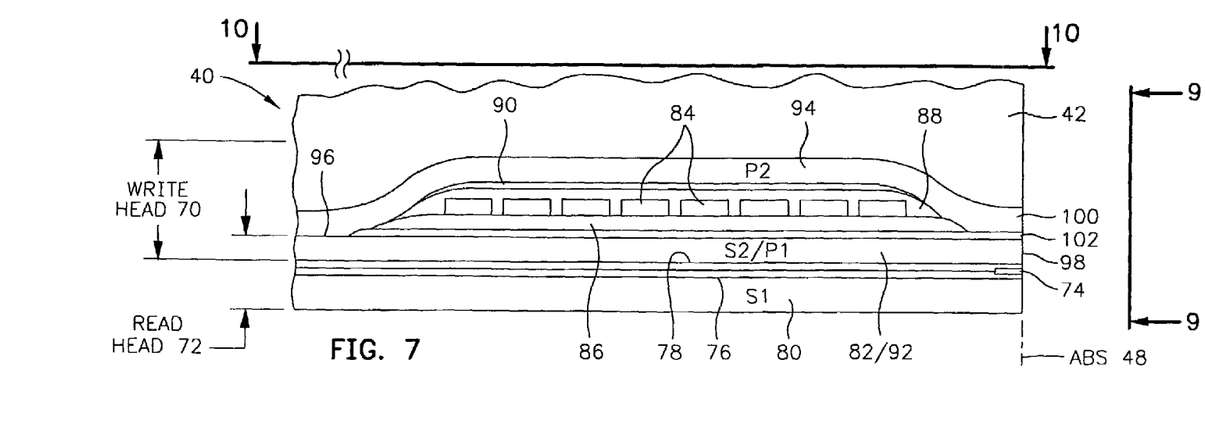
FIG. 7 is a partial view of the slider and a merged magnetic head as seen in plane 7—7 of FIG. 2.
Figure 9:
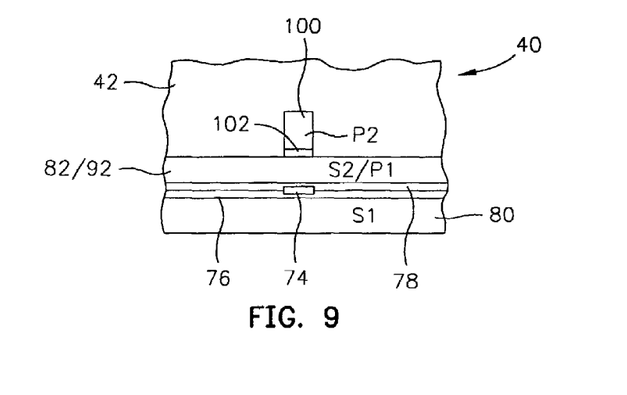
FIG. 9 is a partial ABS view of the slider taken along plane 9—9 of FIG. 7 to show the read and write elements of the merged magnetic head.
Figure 10:
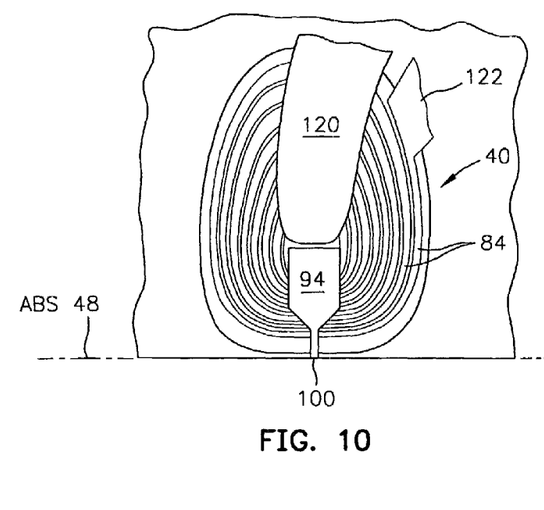
FIG. 10 is a view taken along plane 10—10 of FIG. 6 or 7 with all material above the coil layer and leads removed.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

DESCRIPTION OF THE PREFERRED EMBODIMENTS

Magnetic Disk Drive

Figure 1:
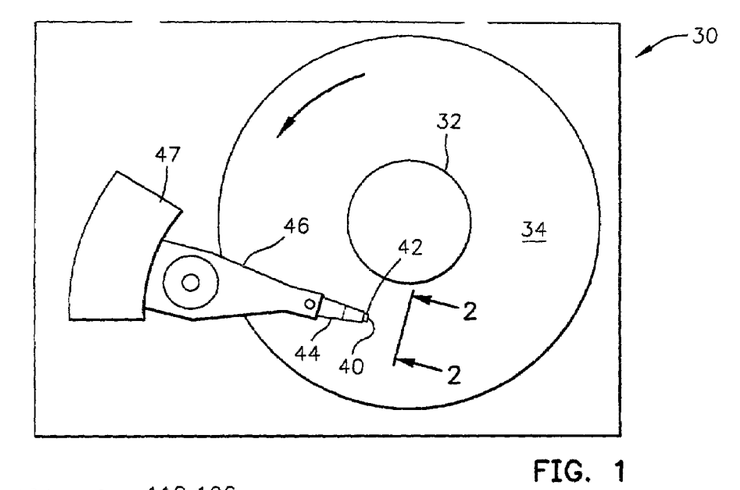
FIG. 1 is a plan view of an exemplary magnetic disk drive.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A combined read and write magnetic head 40 is mounted on a slider 42 that is supported by a suspension 44 and actuator arm 46 which is rotatably positioned by an actuator 47. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals to the actuator 47 for moving the slider to various tracks on the disk. In FIG. 4 the slider 42 is shown mounted to a suspension 44. The components described hereinabove may be mounted on a frame 54 of a housing, as shown in FIG. 3.

Figure 5:
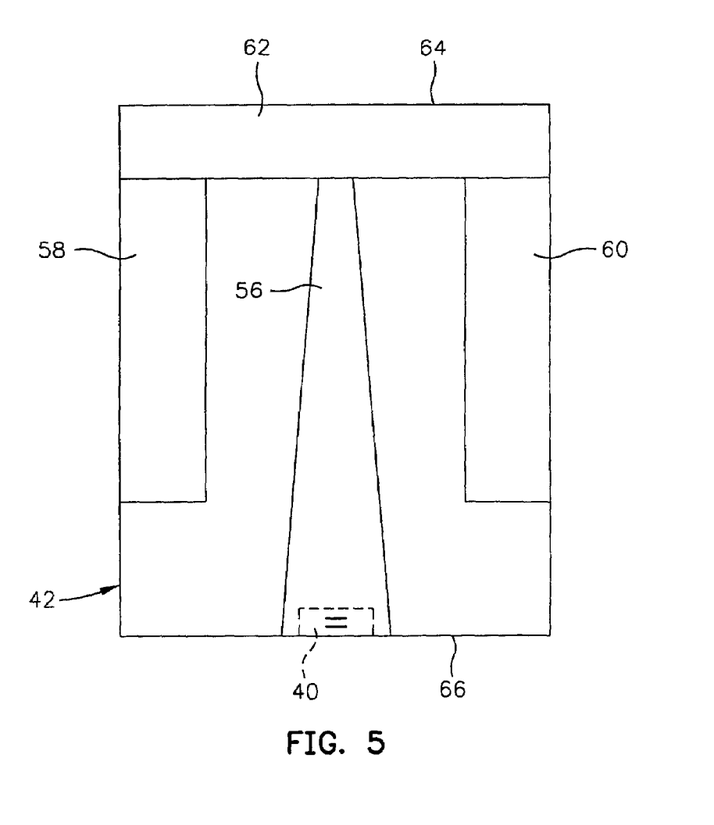
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 11:
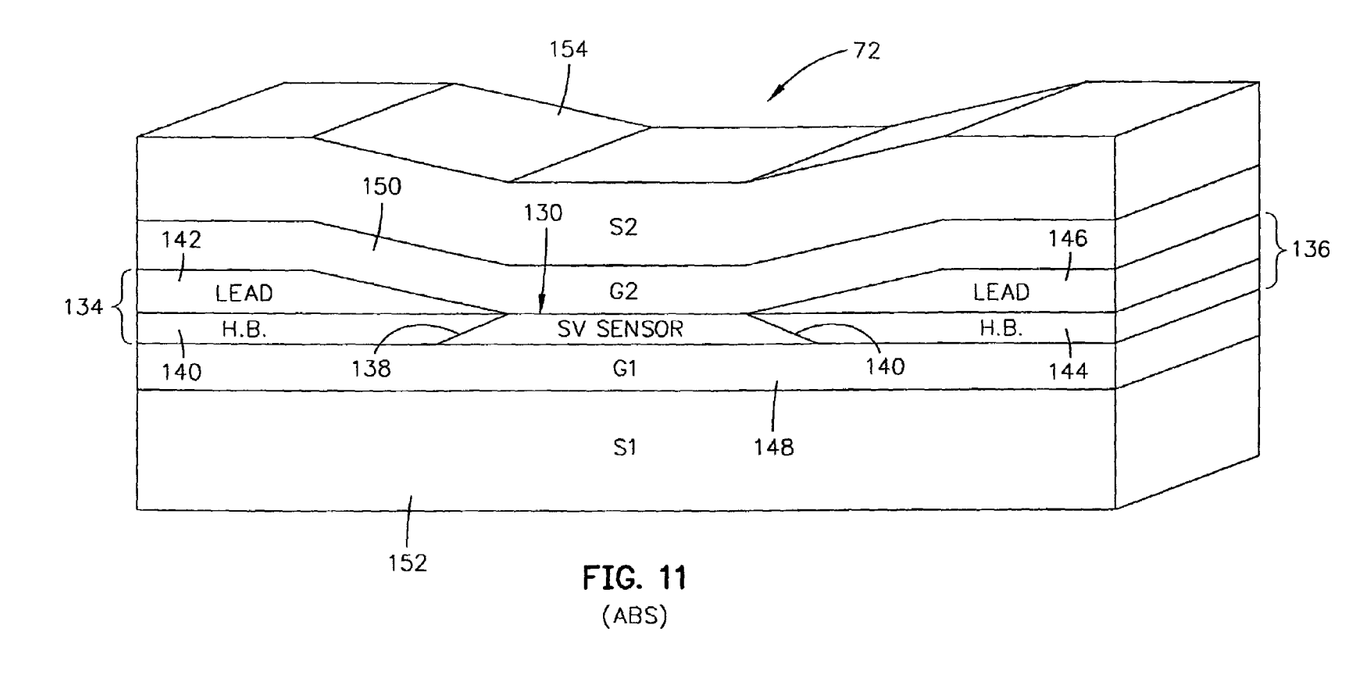
FIG. 11 is an isometric ABS illustration of a read head which employs a spin valve (SV) sensor.

FIG. 11 is an isometric ABS illustration of the read head 72 shown in FIG. 6 or 8. The read head 72 includes the present spin valve sensor 130. First and second hard bias and lead layers 134 and 136 are connected to first and second side edges 138 and 140 of the spin valve sensor. This connection is known in the art as a contiguous junction. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing magnetic domains therein The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

The Invention

Figure 12:
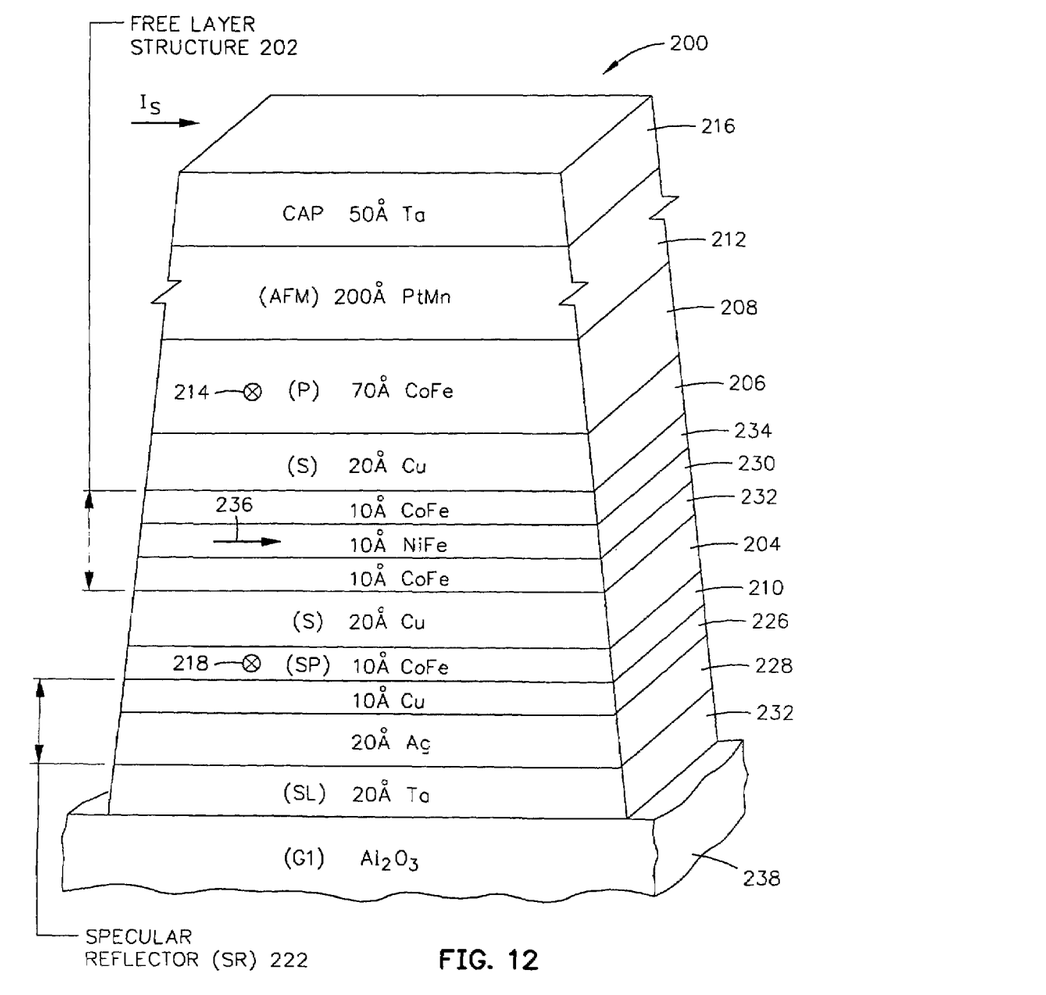
FIG. 12 is an ABS illustration of a first embodiment of the present dual spin valve sensor.
Figure 13:
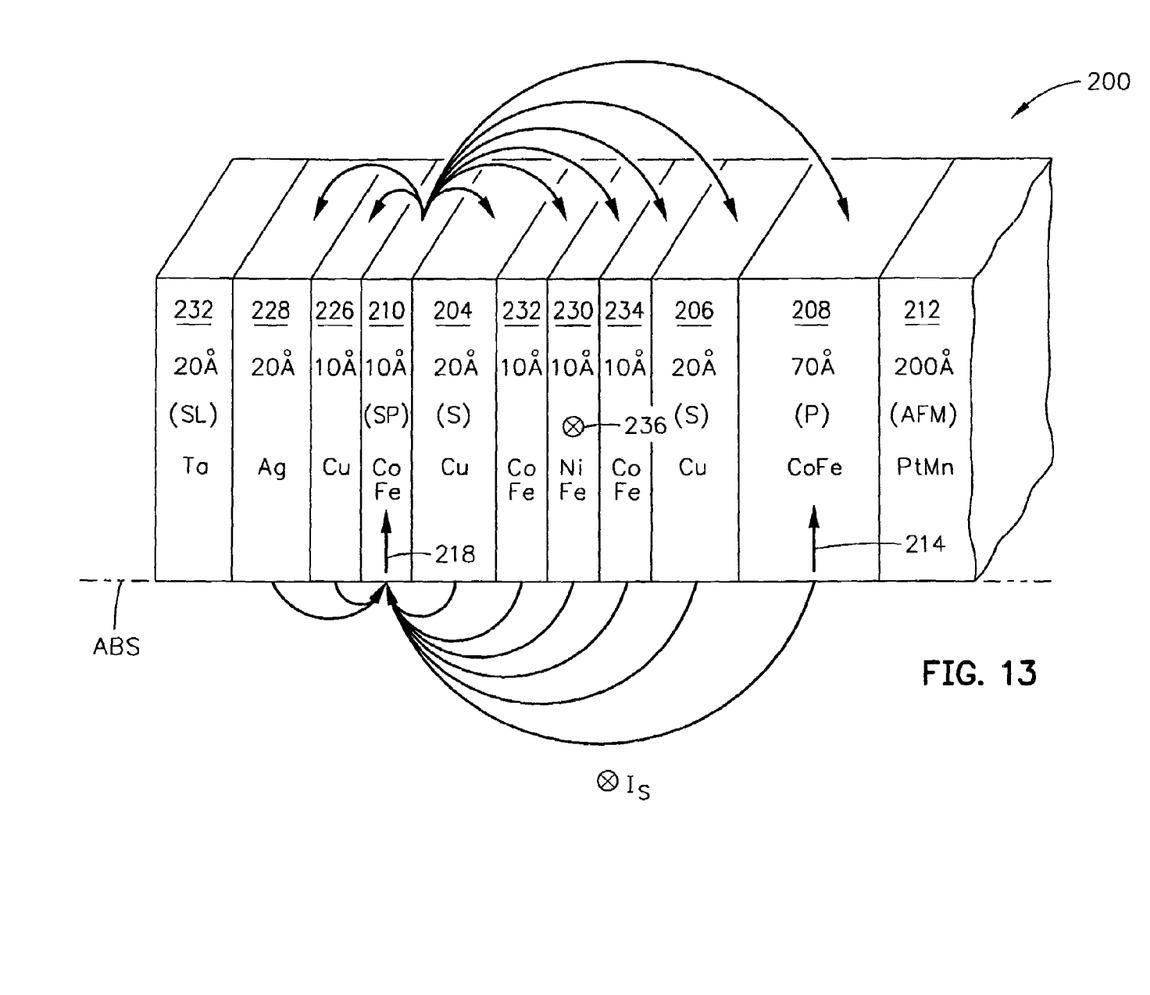
FIG. 13 is FIG. 12 rotated 90° clockwise and 90° toward the viewer.

A first embodiment of the present dual spin valve sensor 200 is illustrated in FIGS. 12 and 13. The sensor 200 includes a ferromagnetic free layer structure 202 which is located between nonmagnetic conductive first and second spacer layers (S) 204 and 206. The designation of first and second layers throughout the description has no significance regarding their respective locations which means that the spacer layer 206 could be the first spacer layer and the spacer layer 204 could be the second spacer layer. The first and second spacer layers 204 and 206 are located between a pinned layer structure (P), which is preferably a single pinned layer 208, and a self-pinned layer (SP) 210 respectively. The pinned layer 208 is exchange coupled to an antiferromagnetic (AFM) pinning layer 212 which pins a magnetic moment 214 of the pinned layer perpendicular to the ABS in a direction toward the ABS or away from the ABS, as shown in FIG. 12. A cap layer 216 may be on the pinning layer 212 for protecting it from subsequent processing steps.

The self-pinned layer 210 has a magnetic moment 218 which is pinned parallel to the magnetic moment 214 by sense current fields from the conductive layers of the spin valve sensor. When the sense current $I_S$ is conducted through the spin valve sensor, the conductive layers above the self-pinned layer 210 exert sense current fields on the self-pinned layer 210 in a direction which is away from the ABS so that the magnetic moment 218 is away from the ABS parallel to the magnetic moment 214. In order for this pinning action to be effective the thickness of the self-pinned layer 210 should be minimal, such as 10 Å. This is because the demagnetization fields from the self-pinned layer has to be less than the sense current fields acting thereon. The demagnetization field of the self-pinned layer is determined by the following formula:

$$\text{demag} = \frac{4\pi M_S t}{\text{stripe height}}$$

where $M_S$ is saturation magnetization of the self-pinned layer 210, t is the thickness of the self-pinned layer and stripe height is the distance between the ABS and the recessed opposite end of the self-pinned layer. For instance, if the self-pinned layer 210 is cobalt iron (CoFe), has a thickness of 10 Å and a stripe height of 0.5 μm, the demagnetization field of the self-pinned layer is 32 Oe. Accordingly, the sense current fields acting on the self-pinned layer 210 should exceed 32 Oe in order to pin the magnetic moment 218 perpendicular to the ABS. Total sense current fields acting on the self-pinned layer 210 are typically between 40 –50 Oe excluding the AFM layer 212. If the pinning layer 212 is composed of a conductive antiferromagnetic material, such as platinum manganese (PtMn), nickel manganese (NiMn), iron manganese (FeMn) or iridium manganese (IrMn), the pinning layer will also contribute a sense current field that pins the magnetic moment 218. In a preferred embodiment the pinning layer 212 is a conductive material for enhancing pinning of the magnetic moment 218.

Unfortunately, the self-pinned layer 210 is so thin that it does not provide an adequate barrier for conduction electrons within the mean free path of conduction electrons between the free layer structure 202 and the self-pinned layer 210. When conduction electrons are scattered at the boundary of the self-pinned layer 210 they are lost from scattering events of the conduction electrons in the mean free path of conduction electrons between the self-pinned layer 210 and the free layer structure 202. Consequently, the magnetoresistive coefficient (dr/R) of the dual spin valve sensor 200 is reduced.

In order to overcome the loss of conduction electrons from phased scattering events of conduction electrons in the mean free path of conduction electrons I have provided a specular reflector structure 222. In a preferred embodiment the specular reflector structure 222 includes a first specular reflector layer 226 composed of copper (Cu) and a second specular layer 228 composed of silver (Ag) or gold (Au), the composition preferably being silver (Ag). The first specular reflector layer 226 is located between and interfaces the self-pinned layer 210 and the second specular reflector layer 228. Silver (Ag) or gold (Au) has greater specular reflection than copper (Cu), however, copper (Cu) has compatibility at high temperatures with the materials typically employed for the self-pinned layer 210, such as cobalt iron (CoFe) or cobalt (Co). Since the first specular reflector layer 226 of copper (Cu) has a lower specular reflection, its thickness is preferably minimal, such as 10 Å, while the higher specular reflecting second specular reflector layer 228 of silver (Ag) or gold (Au) has an increased thickness, which is preferably 20 Å.

With the above scheme the self-pinned layer 210 performs in the same manner as the pinned layer 208. Accordingly, the spin valve sensor 200 has a high spin valve effect on both sides of the free layer structure 202 which are combined for significantly increasing the magnetoresistive coefficient (dr/R) of the sensor. This has been accomplished by eliminating the requirement of an antiferromagnetic pinning layer exchange coupled to the self-pinned layer 210 for pinning its magnetic moment 220. By eliminating this antiferromagnetic pinning layer the overall thickness of the dual spin valve sensor 200 has been reduced by the thickness of the eliminated antiferromagnetic pinning layer less the thicknesses of the first and second specular reflecting layers 226 and 228. Accordingly, a read head employing the spin valve sensor 200 will have a significantly reduced read gap as compared to a read head employing a prior art dual spin valve sensor which has two antiferromagnetic pinning layers.

The free layer structure 202 may include a free layer (F) 230 which is located between first and second nanolayers (N) 232 and 234. The Free layer 230 may be 30 Å of nickel iron (NiFe) and each of the nanolayers 232 and 234 may be 10 Å of cobalt iron (CoFe) or cobalt (Co). It has been found that the nanolayers 232 and 234 increase the magnetoresistive coefficient (dr/R) when placed between the free layer 230 and the first and second spacer layers 204 and 206. A tantalum seed layer (SL) 232 20 Å thick may be located between a first gap layer (G1) 234 and the first specular reflector layer 228 for promoting an improved microstructure of the first specular reflector layer 228.

Exemplary thicknesses and materials for the other layers are the antiferromagnetic pinning layer 212 being 200 Å of platinum manganese (PtMn), the pinned layer 208 being 20 Å of cobalt iron (CoFe) or cobalt (Co), each of the first and second spacer layers 204 and 206 being 20 Å of copper (Cu) and the cap layer 224 being 50 Å of tantalum (Ta).

Figure 16:
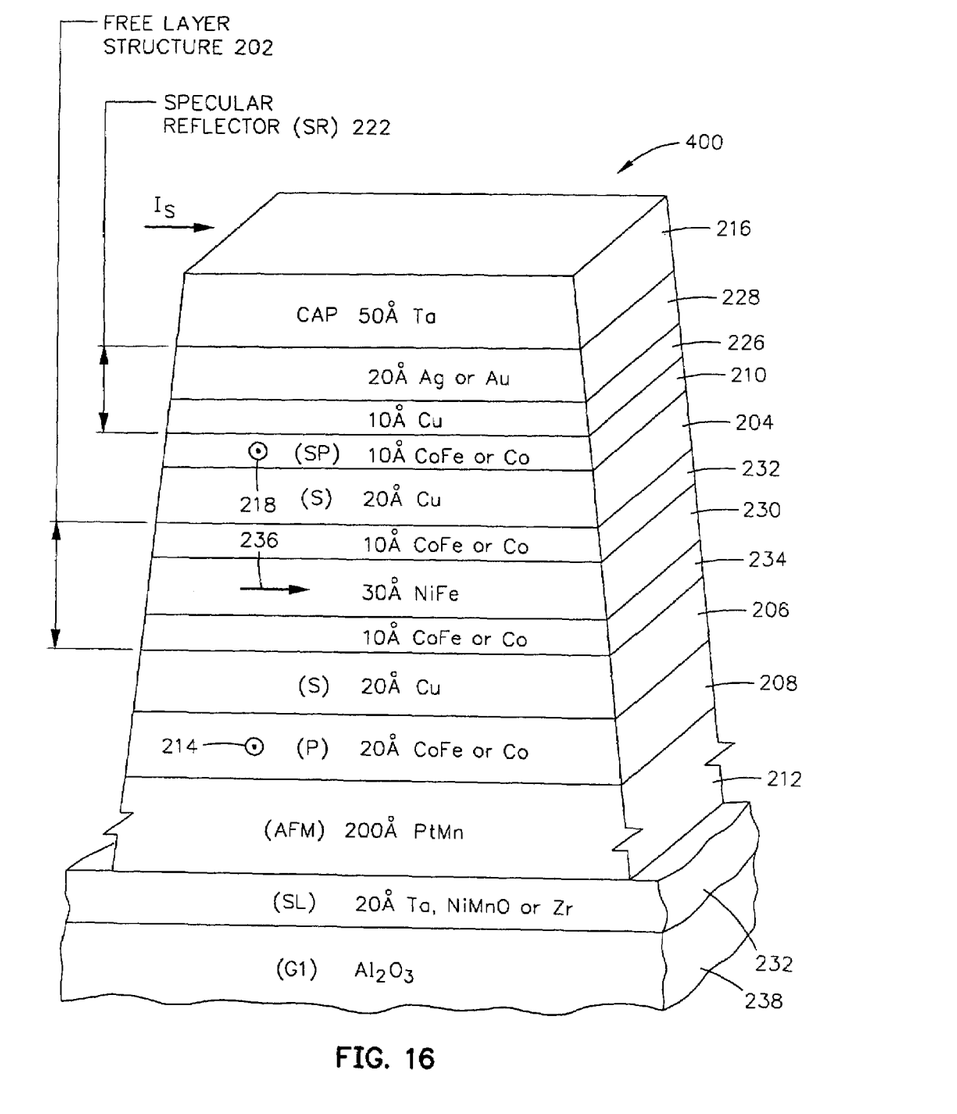
FIG. 16 is an ABS illustration of a third embodiment of the dual spin valve sensor.

FIG. 13 illustrates the sense current fields from all conductive layers acting on the self-pinned layer 210 other than the antiferromagnetic pinning layer 212. It is important that the sense current $I_S$ be conducted through the spin valve sensor 200 so that the sense current fields orient the magnetic moment 218 of the self-pinned layer in a direction that is parallel to the magnetic moment 214 of the pinned layer. When these magnetic moments are parallel they are referred to as being in phase. The magnetic moment 236 of the free layer structure is parallel to the ABS and may be directed to the left or to the right, as shown in FIG. 16. Accordingly, when signal fields are detected by the spin valve sensor 200 the magnetic moment 236 of the free layer structure rotates upwardly or downwardly decreasing or increasing the magnetoresistance respectively of the sensor, which resistance changes are detected in the sense current circuit as potential changes which are detected as playback signals. The spin valve sensor 200 shown in FIGS. 12 and 13 is referred to in the art as a top spin valve sensor since the antiferromagnetic pinning layer 212 is located at the top of the sensor closer to the second gap layer (150 in FIG. 11) than the first gap layer 238 (148 in FIG. 11). Another embodiment of the present invention is a bottom spin valve sensor which is described hereinafter.

In the embodiment shown in FIG. 12 the magnetic spins of the antiferromagnetic layer 212 are set with an outside magnetic field in the presence of heat to direct the magnetic moment 214 away from the ABS so as to set the magnetic spins of the antiferromagnetic pinning layer 212 in the same direction. Accordingly, the blocking temperature of the antiferromagnetic pinning layer 212 should be higher than the operating temperature of the spin valve sensor so that the sense current fields acting on the pinned layer 208 will not reorient the magnetic moment 214.

Figure 14:
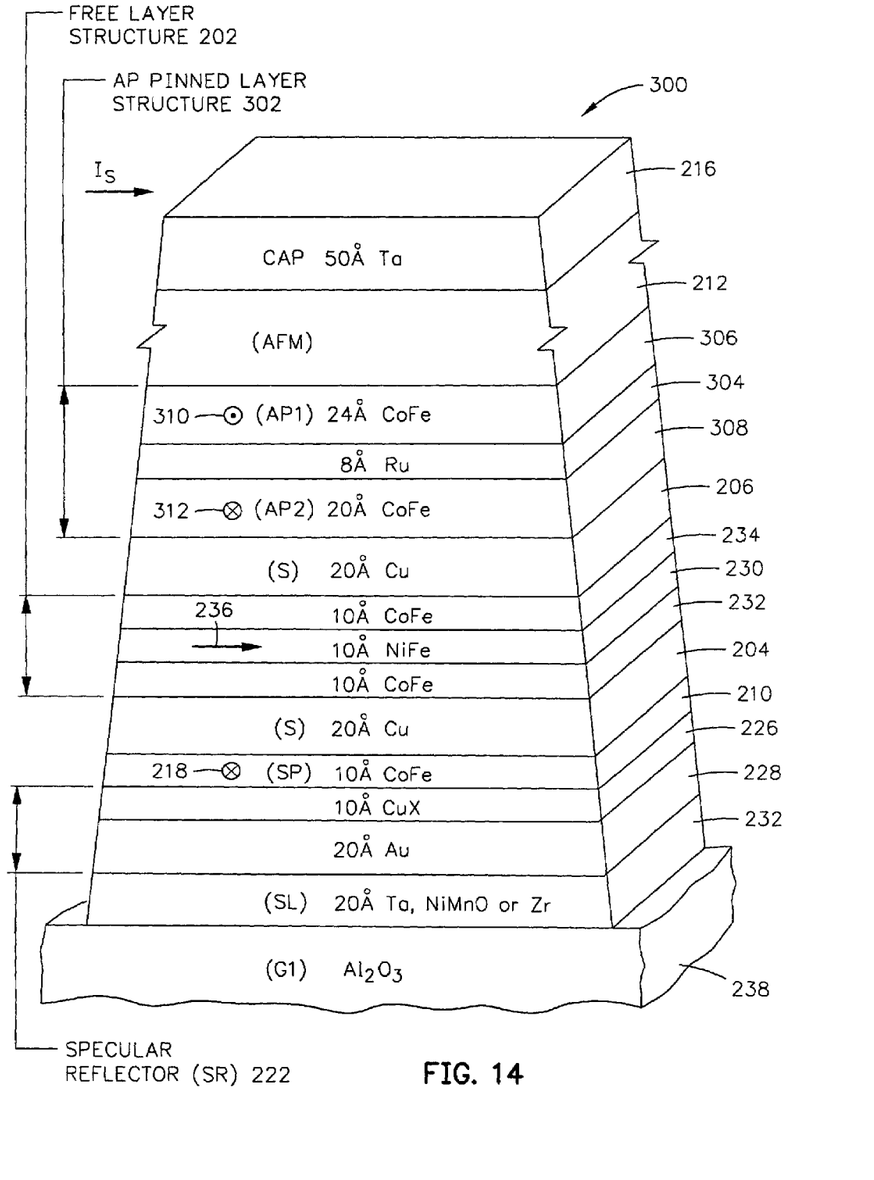
FIG. 14 is an ABS illustration of a second embodiment of the present dual spin valve sensor.
Figure 15:
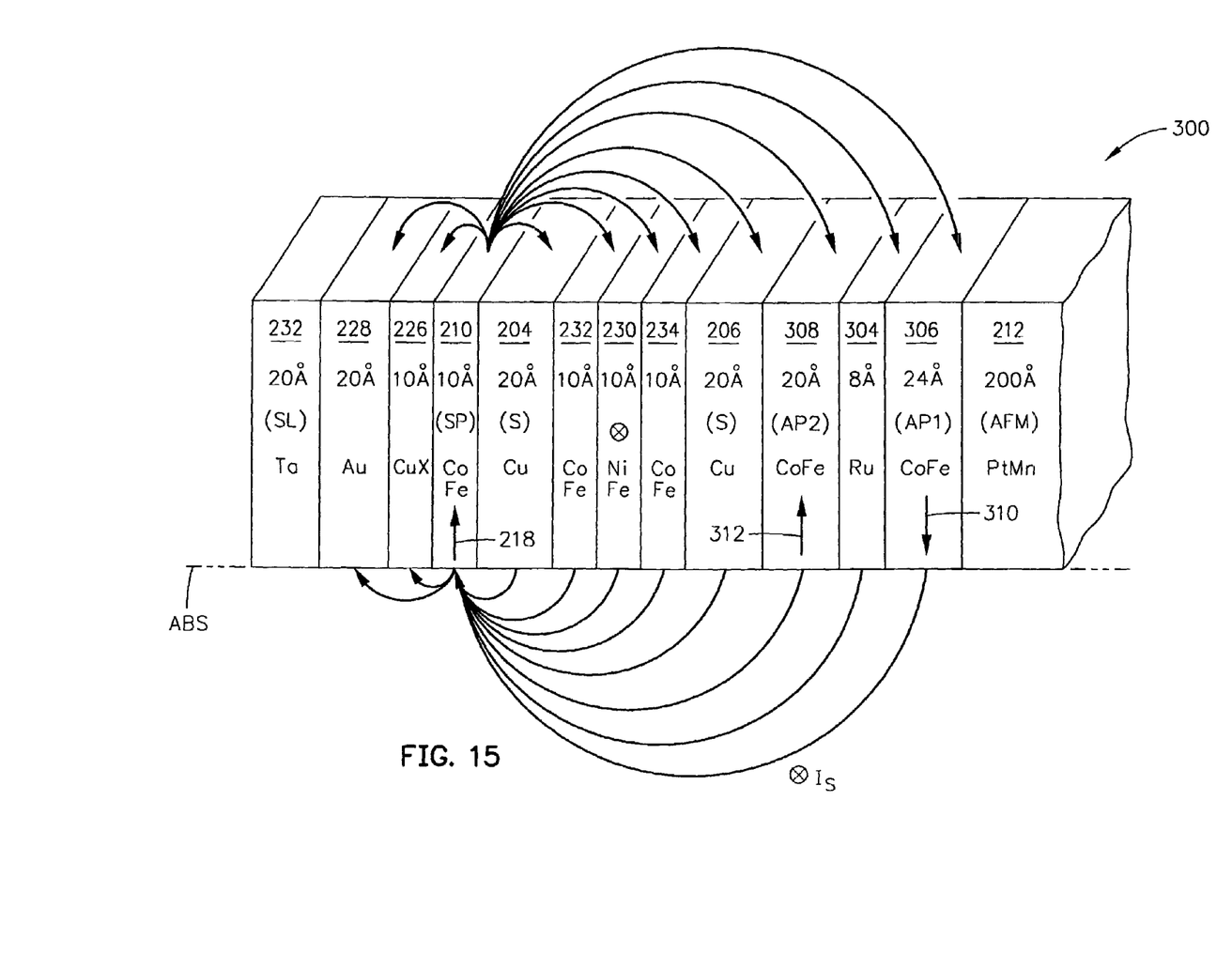
FIG. 15 is FIG. 14 rotated 90° clockwise and rotated 90° toward the viewer.

A second embodiment of the present dual spin valve sensor 300 is illustrated in FIGS. 14 and 15. The dual spin valve sensor 300 is the same as the spin valve sensor 200 illustrated in FIGS. 12 and 13 except an antiparallel (AP) pinned layer structure 302 has been substituted for the pinned layer 208, the second specular reflector layer 228 may optionally be gold (Au), the seed layer 232 may optionally be nickel manganese oxide (NiMnO) or zirconium (Zr), and the first specular reflector layer 226 may be composed of an alloy of copper (Cu) and X where X is a high resistance material such as nickel (Ni), zirconium (Zr) or chromium (Cr) for reducing shunting of the sense current through the first specular reflector structure 222. The AP pinned layer structure 302 includes an antiparallel coupling layer 304 which is located between first and second ferromagnetic antiparallel layers (AP1) and (AP2) 306 and 308. The first antiparallel layer 306 is exchange coupled to the antiferromagnetic pinning layer 212 which pins the magnetic moment 310 of the first antiparallel pinned layer 306 perpendicular to the ABS in a direction away from or toward the ABS, as shown in FIG. 14. By strong antiparallel coupling between the first and second antiparallel pinned layers 306 and 308 the magnetic moment 312 of the second AP pinned layer is pinned antiparallel to the magnetic moment 310. Accordingly, the magnetic moments 218 and 312 are in phase for enabling spin valve effects that are additive on each side of the free layer structure 202.

The AP pinned layer structure 302 is preferred over the single pinned layer 208 in FIG. 12. Since the magnetic spins of the antiferromagnetic pinning layer 212 are oriented by the magnetic moment 310 of the first AP pinned layer the sense current fields from the conductive layers acting on the first AP pinned layer 306 urge the magnetic moment 312 away from ABS instead of toward the ABS, as shown at 214 in FIG. 12. It should be noted that the first AP pinned layer 306 is 24 Å of cobalt iron (CoFe) while the second AP pinned layer 308 is 20 Å of cobalt iron (CoFe). The thicker first AP pinned layer 306 permits the first AP pinned layer to be the controlling layer within the AP pinned layer structure 302 when orientation of the magnetic spins of the pinning layer is set. The antiparallel coupling layer 304 between the first and second AP pinned layers 306 and 308 is typically 8 Å of ruthenium (Ru).

FIG. 15 illustrates the sense current fields acting on the self-pinned layer 210 when the sense current $I_S$ is directed into the page, as shown in FIG. 15. The direction of the sense current is important for ensuring that the magnetic moment 218 of the self-pinned layer is parallel to the magnetic moment 312 of the second AP pinned layer 308. Accordingly, when the magnetic moment 236 of the free layer is rotated upwardly or downwardly in response to signal fields from a rotating magnetic disk the magnetoresistance will decrease or increase respectively for changing the potential in a sense current circuit so that these potentials can be detected as playback signals. It should also be noted that the sense current $I_S$ may be employed for resetting the magnetic spins of the pinning layer 212 which is not true for the embodiment in FIG. 12.

Figure 17:
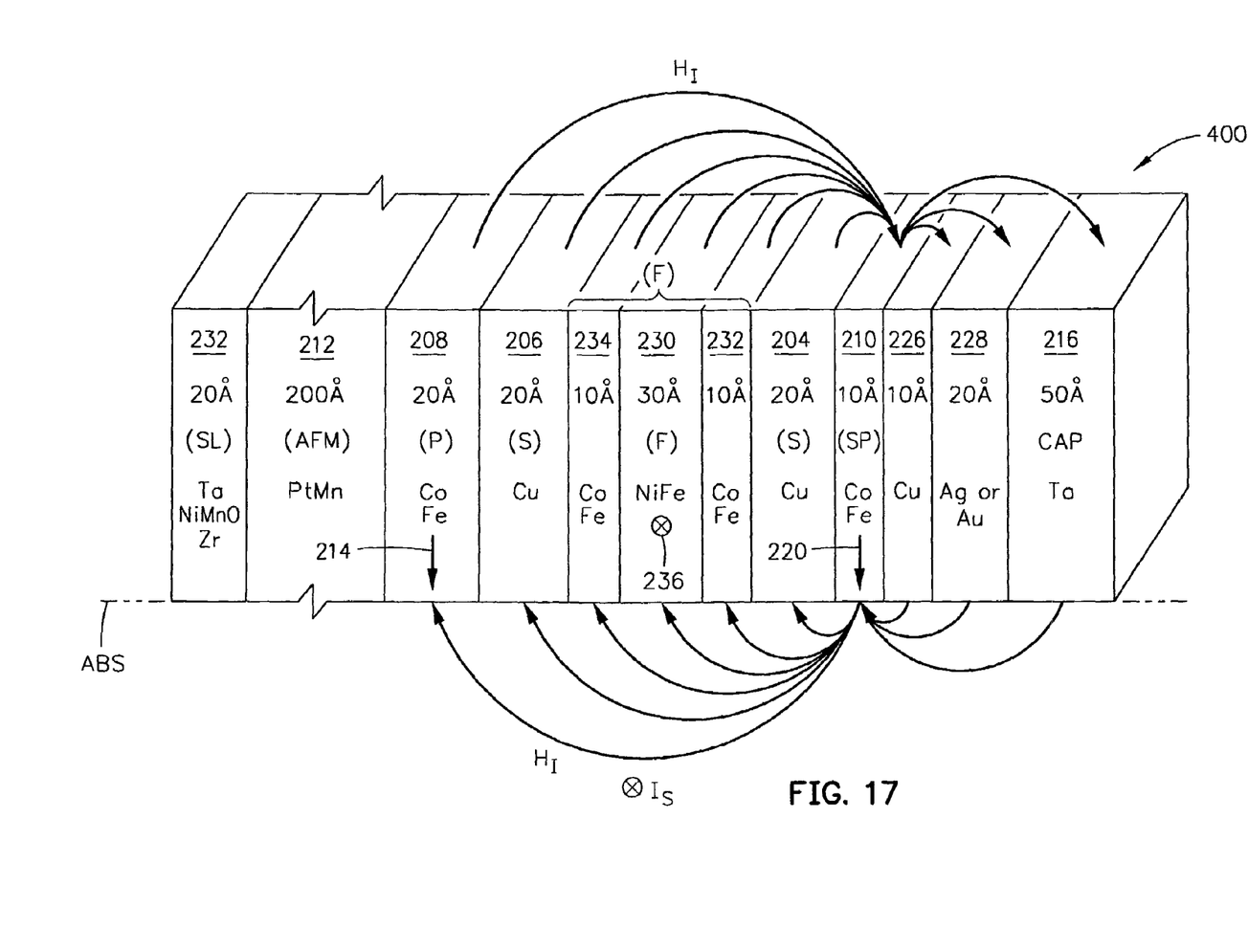
FIG. 17 is FIG. 16 rotated clockwise 90° and rotated 90° toward the viewer.

A third embodiment of the present spin valve sensor 400 is shown in FIGS. 16 and 17. This spin valve sensor is the same as the spin valve sensor 200 shown in FIG. 12 except all of the layers of the spin valve sensor have been reversed or turned upside down except for the seed layer 232 and the cap layer 216. This type of spin valve sensor is referred to in the art as a bottom spin valve sensor since the antiferromagnetic pinning layer 212 is now located at the bottom instead of at the top. It should be noted that the sense current $I_S$ now causes the magnetic moment 218 of the self-pinned layer to be toward the ABS instead of away from the ABS. Accordingly, the magnetic moment 214 of the pinned layer 208 should be pinned perpendicular to and toward the ABS by the antiferromagnetic pinning layer 212 so that the magnetic moments 214 and 218 are parallel with respect to one another. With the magnetic moment 236 of the free layer structure parallel to the ABS, as shown in FIGS. 16 and 17, a rotation upwardly or downwardly of the magnetic moment 236 in response to a signal field from a rotating magnetic disk will increase or decrease the magnetoresistance of the spin valve sensor 400 which causes changes in the resistance in the sense current circuit producing potential changes which can be detected as readback signals.

It should be understood that the ferromagnetic layers described hereinabove may be constructed of various ferromagnetic materials such as nickel iron RiFe), cobalt iron (CoFe) or cobalt (Co). The thicknesses of the layers are exemplary and may be varied as desired keeping in mind that they should be as thin as possible in order to promote an improved read gap. In this regard the free layer structure 202 is preferably 30 Å as shown in FIG. 12. The pinning layers may be constructed of various antiferromagnetic materials. Nonmagnetic nonconductive antiferromagnetic materials are nickel oxide (NiO) and alpha iron oxide ($\alpha Fe_2O_3$) and antiferromagnetic conductive materials are platinum manganese (PtMn), nickel manganese (NiMn), iron manganese (FeMn) and iridium manganese (IrMn). Conductive antiferromagnetic materials may be employed for enhancing pinning of the self-pinned layer 210. A preferred conductive antiferromagnetic material is iridium manganese (Mn) which will pin the pinned layer when its thickness is only 120 Å. The spin valve sensors described hereinabove are employed in the read head shown in FIG. 11 which may be further employed in the magnetic disk drive shown in FIG. 3.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A method of making a magnetic head assembly that includes a write head and a read head comprising:
    making the write head as follows;
        forming first and second pole piece layers with each of the first and second pole piece layers having a yoke portion located between the pole tip portion and a back gap portion;
        forming a nonmagnetic write gap layer between the pole tip portions of the first and second pole piece layers;
        forming an insulation stack with at leas one coil layer embedded therein between the yoke portions of the first and second pole piece layers; and
    connecting the first and second pole piece layers at their back gaps portions; and
    making the read head as follows:
        forming a spin valve sensor between nonmagnetic nonconductive first and second read gap layers; and
        forming the first and second read gap layers between a ferromagnetic first shield layer and the first pole piece layer; and
    making the spin valve sensor as follows:
        forming nonmagnetic conductive first and second spacer layers;
        forming a ferromagnetic free layer structure between the first and second spacer layers that have a magnetic moment;
        forming an antiferromagnetic pinning layer;
        forming a pinned layer structure between the first spacer layer and the pinning layer with a magnetic moment pinned by the pinning layer;
        forming a nonmagnetic conductive specular reflector layer structure; and
        forming a self-pinned layer between the second spacer layer and the specular reflector layer structure having a magnetic moment that can be pinned by sense current fields parallel to the magnetic moment of the pinned layer structure.

2. A method as claimed in claim 1 wherein the making of the read head further includes:

forming a ferromagnetic second shield layer; and forming a nonmagnetic nonconductive separation layer between the second shield layer and the first pole piece layer.

3. A method as claimed in claim 1 including:

forming the specular reflector layer structure with a first specular reflector layer composed of copper (Cu) and a second specular layer composed of silver (Ag); and forming the first specular reflector layer between and interfacing the second specular reflector layer and the self-pinned layer.

4. A method as claimed in claim 1 including:

forming the specular reflector layer structure with a first specular reflector layer composed of copper (Cu) and a second specular reflector layer composed of gold (Au); and;

forming the first specular reflector layer between the second specular reflector layer and the self-pinned layer.

5. A method as claimed in claim 1 wherein the free layer structure is formed between the first gap layer and the pinning layer.

6. A method as claimed in claim 5 wherein the pinned layer structure is formed of an antiparallel (AP) pinned layer structure, the method of making the AP pinned layer structure further comprising:

forming ferromagnetic first and second antiparallel (AP) pinned layers; and forming an antiparallel (AP) coupling layer between the first and second AP pinned layers.

7. A method as claimed in claim 5 wherein the pinned layer structure is formed of a ferromagnetic single pinned layer.

8. A method as claimed in claim 7 including:

forming the specular reflector layer structure with a first specular reflector layer composed of copper (Cu) and a second specular layer composed of silver (Ag); and forming the first specular reflector layer between and interfacing the second specular reflector layer and the self-pinned layer.

9. A method as claimed in claim 8 wherein the self-pinned layer is formed with a thickness that is less than a thickness of the single self-pinned layer.

* * * * *

UNITED STATES PATENT AND TRADEMARK OFFICE
CERTIFICATE OF CORRECTION

PATENT NO. : 6,983,530 B2  
APPLICATION NO. : 10/611628  
DATED : January 10, 2006  
INVENTOR(S) : Hardayal Singh Gill Page 1 of 1

It is certified that error appears in the above-identified patent and that said Letters Patent is hereby corrected as shown below:

Column 10, Claim 1, Line 42: "leas" should be changed to --least--

Signed and Sealed this

Eighteenth Day of November, 2008

JON W. DUDAS  
*Director of the United States Patent and Trademark Office*